DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 3, 1974

929 O.G. 9

T929,003

POWDER COATING COMPRISING A CELLULOSE ESTER AND A BLOCKED ISOCYANATE

Roy C. Foulk, 3630 Woodlark Lane 37660, and Richard L. Smith, 112 Meadow Lane 37663, both of Kingsport, Tenn.

Continuation of abandoned application Ser. No. 290,662, Sept. 20, 1972. This application Sept. 4, 1973, Ser. No. 394,240

Int. Cl. C08b *21/06, 27/34, 27/52*

U.S. Cl. 106—169

No Drawing. 7 Pages Specification

Disclosed is a powder coating comprising an admixture of a blocked isocyanate and a cellulose ester which can be either cellulose acetate butyrate or cellulose acetate propionate. Plasticizers, stabilizers and pigments can optionally be added to the admixture. The powder coating can be applied to a heatable substrate and caused to fuse by application of heat to produce a smooth, strongly adherent, uncratered, thermally set coating.